United States Patent
Yang et al.

(10) Patent No.: US 11,440,212 B2
(45) Date of Patent: Sep. 13, 2022

(54) POWER TOOL

(71) Applicant: Nanjing Chervon Industry Co., Ltd., Nanjing (CN)

(72) Inventors: Dezhong Yang, Nanjing (CN); Jifeng Feng, Nanjing (CN); Li Pan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 218 days.

(21) Appl. No.: 16/896,926

(22) Filed: Jun. 9, 2020

(65) Prior Publication Data
US 2020/0384664 A1 Dec. 10, 2020

(30) Foreign Application Priority Data

Jun. 10, 2019 (CN) .......................... 201910494713.0
Jun. 10, 2019 (CN) .......................... 201920857081.5

(51) Int. Cl.
*B27B 17/08* (2006.01)
*H02P 29/032* (2016.01)
*B25F 5/02* (2006.01)
*B27B 17/02* (2006.01)

(52) U.S. Cl.
CPC .............. *B27B 17/083* (2013.01); *B25F 5/02* (2013.01); *H02P 29/032* (2016.02); *B27B 17/02* (2013.01)

(58) Field of Classification Search
CPC ... Y10T 83/141; Y10T 83/148; B27B 17/083; B27B 17/02; B27B 17/00; H02P 29/032; H02P 29/00; B25F 5/02

USPC .......................................................... 30/381
See application file for complete search history.

(56) References Cited

U.S. PATENT DOCUMENTS

| | | | |
|---|---|---|---|
| 5,901,269 A * | 5/1999 | Chang | H02P 7/245 83/72 |
| 2002/0020262 A1* | 2/2002 | Gass | B27B 5/38 83/DIG. 1 |
| 2011/0000736 A1* | 1/2011 | Oya | B62D 5/0457 180/443 |
| 2011/0058288 A1* | 3/2011 | Vanko | H02P 23/26 361/33 |
| 2012/0074877 A1* | 3/2012 | Shi | H02P 29/032 318/139 |
| 2017/0297216 A1* | 10/2017 | Kachi | B27B 17/02 |

\* cited by examiner

*Primary Examiner* — Phong H Nguyen
(74) *Attorney, Agent, or Firm* — Greenberg Traurig, LLP

(57) ABSTRACT

A power tool includes a function member, a motor, a driving circuit electrically connected to the motor to drive the motor, and a first control module configured to output a first control signal to the driving circuit. The first control module has a first working state and a first failure state. The first control module outputs a first working signal when the first control module is in the first working state, and outputs a first failure signal when the first control module is in the first failure state. A second control module is electrically connected to the first control module to receive the first working signal or the first failure signal from the first control module. The second control module outputs a second control signal to turn off the motor when the second control module receives the first failure signal from the first control module.

18 Claims, 10 Drawing Sheets

POWER TOOL

RELATED APPLICATION INFORMATION

This application claims the benefit of CN 201910494713.0, filed on Jun. 10, 2019, and CN 201920857081.5, filed on Jun. 10, 2019, the disclosures of which are incorporated herein by reference in their entirety.

TECHNICAL FIELD

The present disclosure relates to a power tool, in particular, a power tool having a protection function.

BACKGROUND

Power tools in the related art, such as an angle grinder, a sander, a reciprocating saw, a circular saw, a jig saw, a pruning machine and a chain saw, have certain risks during working, and the power tools need to be provided with a protection measure.

Taking a chain saw as an example, the chain saw is mainly used for logging and timber, and the working principle is that the chain saw performs the cutting action through the lateral movement of L-shaped blades disposed on a saw chain in a staggered manner. The chain saw usually adopts a high current switch to control the start and stop of a motor; but as an operating current continues to increase, it is difficult to choose the type of the high current switch. Currently a signal switch is adopted to replace the high current switch, and the running process of the motor is controlled through a controller identifying a state of the signal switch, which requires a higher reliability of the system of the power tool. Once the controller fails, the safety accident may occur.

SUMMARY

In order to address the above and other problems with the prior art, a technical scheme is adopted by the present disclosure as follows.

In one example, a power too includes a function member configured to realize a function of the power tool; a motor configured to drive the function member; a driving circuit electrically connected to the motor and configured to drive the motor; a first control module configured to output a first control signal to the driving circuit, where the first control module has a first working state and a first failure state, the first control module is configured to, in condition that the first control module is in the first working state, output a first working signal, and is further configured to, in condition that the first control module is in the first failure state, output a first failure signal; and a second control module electrically connected to the first control module, where the second control module is configured to receive the first working signal or the first failure signal from the first control module, where the second control module is configured to, in response to receiving the first failure signal from the first control module, output a second control signal to turn off the motor.

In one example, the first control module and the second control module are in communication connection to each other. The second control module has a second working state and a second failure state. The second control module is configured to, in condition that the second control module is in the second working state, output a second working signal to the first control module, and is further configure to, in condition that the second control module is in the second failure state, output a second failure signal to the first control module. And the first control module is configured to, in response to receiving the second failure signal from the second control module, output a first control signal to turn off the motor.

In one example, the power tool further includes a protection circuit, where the protection circuit is electrically connected to the second control module, and is configured to, in condition that the protection circuit receives the second control signal from the second control module, turn off the motor.

In one example, the power tool further includes a power supply device configured to supply power to the power tool, where the protection circuit includes a switch circuit, and the switch circuit is configured to cut off an electrical connection between the motor and the power supply device, where the switch circuit comprises at least one electronic switch.

In one example, the protection circuit further includes a switch control circuit, the switch control circuit is electrically connected to the switch circuit and the second control module, and is configured to control the on-off of the switch circuit according to the second control signal from the second control module so as to cut off the electrical connection between the motor and the power supply device.

In one example, the driving circuit includes a plurality of driving switches. The switch circuit includes a first electronic switch, and the first electronic switch is electrically connected between control terminals of at least part of the driving switches and the first control module, and is configured to cut off electrical connections between the first control module and the control terminals of the at least part of the driving switches. The switch control circuit includes a second electronic switch, the second electronic switch is electrically connected between a control terminal of the first electronic switch and the second control module, and is configured to control the on-off of the first electronic switch according to the second control signal of the second control module so as to cut off the electrical connections between the first control module and the at least part of the driving switches, thereby cutting off the electrical connection between the motor and the power supply device.

In one example, the driving circuit includes a plurality of driving switches, and the switch circuit includes a third electronic switch, where the third electronic switch is electrically connected between control terminals of at least part of the driving switches and a ground lead. A control terminal of the third electronic switch is electrically connected to the second control module, and the third electronic switch is configured to switch on connections between the at least part of the driving switches and the ground lead according to the second control signal of the second control module so as to cut off the electrical connection between the motor and the power supply device.

In one example, the second control module includes a control circuit and the control circuit includes at least one switch element.

In one example, the second control module includes a microcontroller.

In one example, the power tool further includes a start switch configured to at least start the power tool, where the start switch is connected to the first control module, and the first control module is configured to, in condition that the first control module detects that the start switch is triggered and receives the second working signal from the second control module, output the first control signal to start the motor.

In one example, the power tool further includes a brake switch configured to brake the motor, where the brake switch is connected to the first control module, and the first control module is configured to, in condition that the first control module detects that the brake switch is triggered and receives the second working signal from the second control module, output the first control signal to the driving circuit so as to brake the motor.

An advantage of the present disclosure is as follows: the safety of the power tool is improved.

DETAILED DESCRIPTION

The present disclosure is described hereinafter through specific examples in conjunction with the accompanying drawings.

A power tool 10 of the present disclosure may be a hand-gripped power tool or a garden tool, which is not limited herein. The power tool of the present disclosure includes but are not limited to an electric drill, an impact drill, an angle grinder, a sander, a reciprocating saw, a circular saw, a jig saw, an electric hammer, a pruning machine, a chain saw and other power tools having certain dangers. The power tools are within the protection scope of the present disclosure, as long as the power tools adopt the essential contents of the technical solutions of the present disclosure.

Figure 1:
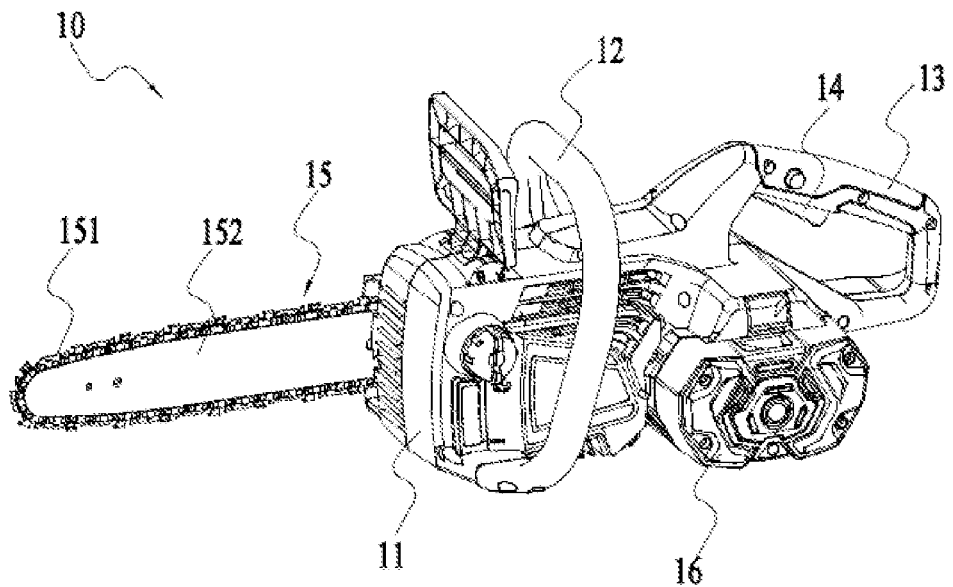
FIG. 1 shows a power tool according to an example of the present disclosure.
Figure 2:
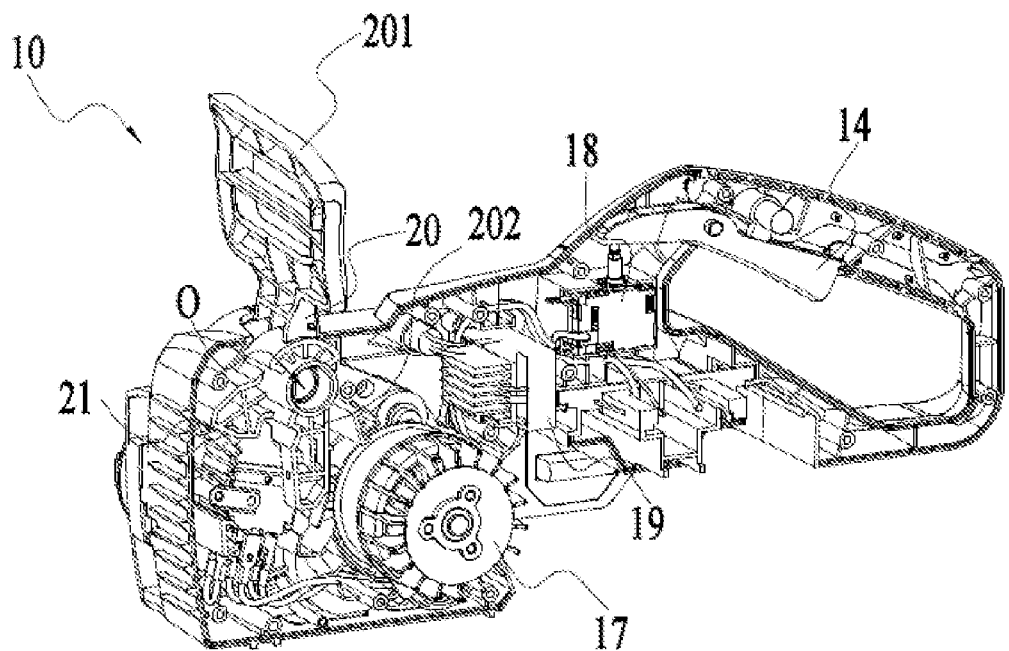
FIG. 2 is a partial structural diagram illustrating an interior of the power tool in FIG. 1.

With reference to FIG. 1 and FIG. 2, in one example, a power tool 10 is exemplified by a chain saw. The power tool 10 includes a case 11, a front handle 12 and a main handle 13 that are disposed on the case 11, a trigger mechanism 14 disposed on the main handle 13, a function member 15 for realizing specific functions, a power supply device 16 and a motor 17 for driving the function member 15 to move.

The function member 15 is configured for realizing functions of the power tool 10. For the chain saw, the function member 15 of the power tool 10 includes a saw chain 151 and a guide plate 152, and is configured for realizing a cutting function. The motor 17 is configured for driving the function member. For the chain saw, the saw chain 151 is disposed surrounding and onto an edge of the guide plate 152, and is configured for circular guiding along the guide plate 152 under driving of the motor 17. One end of the guide plate 152 is supported onto the case 11, and another end of the guide plate 152 extends out of the case 11 along a longitudinal direction of the case 11.

The trigger mechanism 14 is operably triggered by a user, and configured for controlling the start of the power tool 10. The trigger mechanism 14 may be, but not limited to a trigger. The power tool 10 further includes a start switch 18 associatively connected to the trigger mechanism 14 and disposed in the case 11. When the trigger mechanism 14 is triggered, the start switch 18 connected to the trigger mechanism 14 is triggered accordingly, and a trigger state of the start switch 18 is changed.

The power tool 10 further includes the power supply device 16 that is configured for supplying power to the power tool 10. In some examples, the power tool 10 is powered by a DC power source. In one example, the power tool 10 is powered by a battery pack, and the power supply device 16 includes a battery pack. In other examples, the power tool 10 is powered by an AC power source which may be AC mains power with 120V or 220V. An AC signal output by the power source is rectified, filtered, divided, and depressurized and the like by a hardware circuit, such that the AC is converted into electrical energy that can be used by the power tool 10. In the present example, the power tool 10 is powered by a battery pack. The voltage output by the battery pack is subject to a voltage change through a specific power source circuit (such as a DC-DC conversion chip) so as to output a power supply voltage suitable for the motor 17, a control module and the like.

In one example, in order to facilitate the user to brake the power tool 10 in an emergency (for example, a danger occurs), the power tool 10 further includes a brake control member 20. The brake control member 20 is associatively connected to a brake switch 21, and the brake switch 21 is configured to cause the motor 17 into a brake process. In one example, the brake control member 20 is a brake baffle, and is rotatable relative to the case 11 about a pivot. It should be understood that the brake control member 20 may be disposed in a form of a button according to actual design needs, and the button is pressed when the brake is needed. One end of the brake control member 20 is formed with a brake operation part 201 for the operator to perform a brake operation when a dangerous situation occurs, and another end of the brake control member 20 is formed with a cantilever arm 202 that is rotatable relative to the case 11, and the cantilever arm 202 may trigger the brake switch 21. The above manual brake control is provided, such that the user may brake the power tool 10 at any time, which is convenient to use.

The normal running of the above power tool 10 also depends on a circuit system. At least part of circuit components of the circuit system is disposed on a circuit board 19, and the circuit board 19 is disposed in the case.

Figure 3:
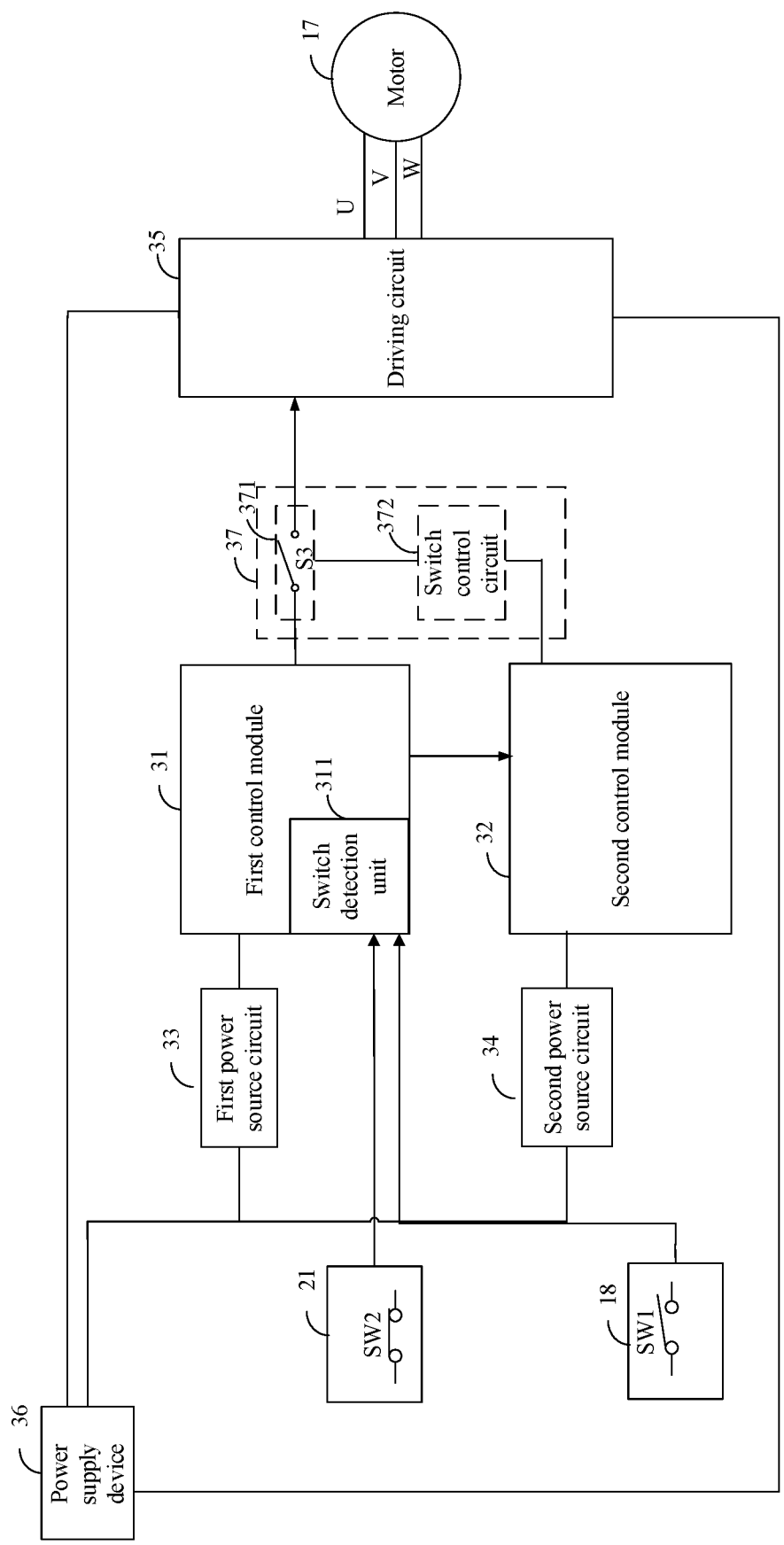
FIG. 3 is a circuit block diagram illustrating a power tool according to an example of the present disclosure.

With reference to FIG. 3, in one example, the circuit system of the power tool 10 mainly includes a first control module 31, a second control module 32, a driving circuit 35, a power supply device 36 and a motor 17.

The power supply device 36 is configured to supply power to the power tool 10, for example, the power supply device 36 is a battery pack. In one example, the power tool 10 further includes a fuse (not shown in the drawings) and a capacitor (not shown in the drawing). The power supply device 36 is connected to the fuse, the fuse is configured for overcurrent protection, and one end of the fuse is connected to the capacitor. The capacitor is configured for filtering and absorbing ripple, and the capacitor is connected in parallel with the driving circuit 35.

Figure 4:
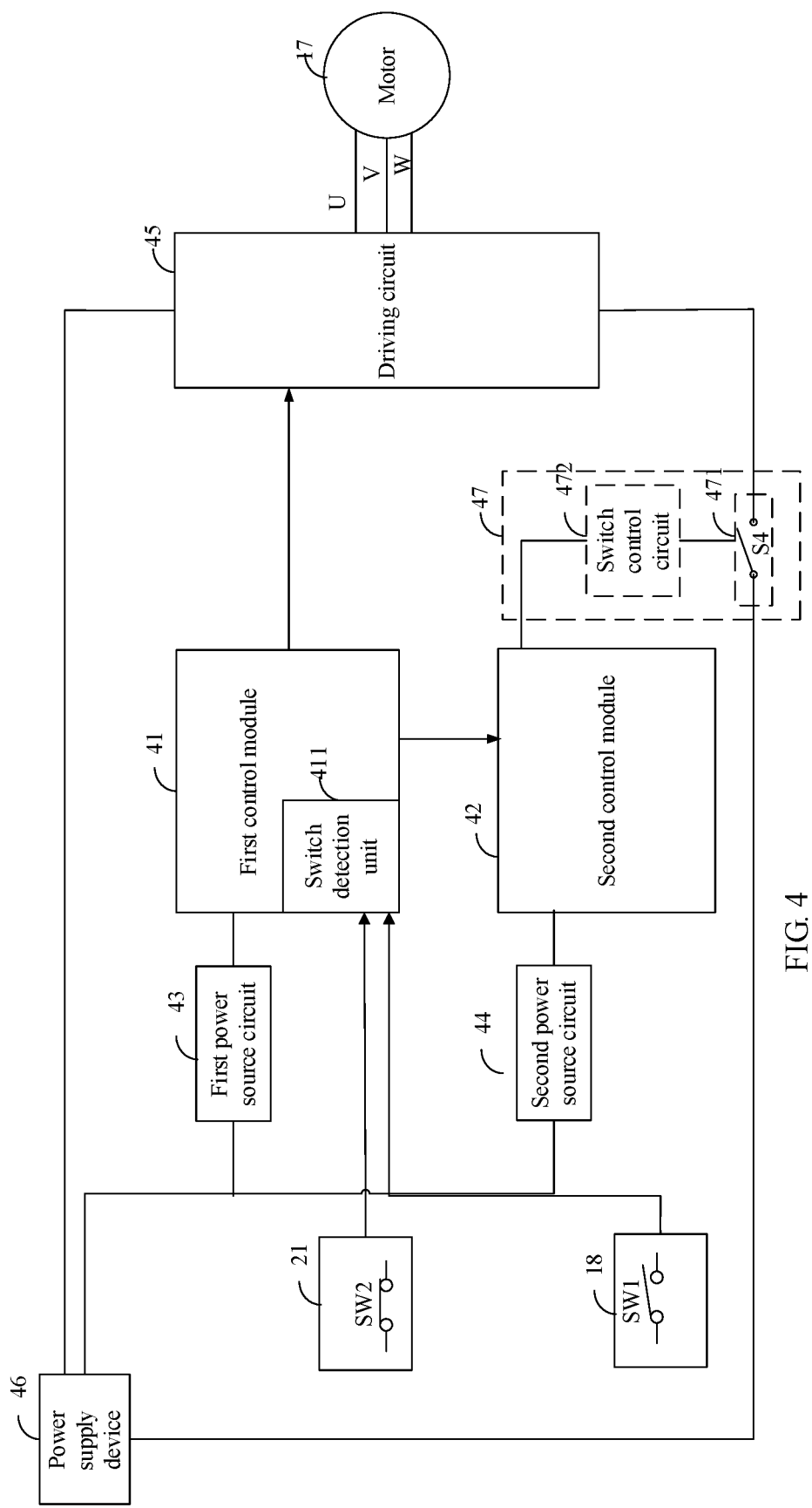
FIG. 4 is a circuit block diagram illustrating another power tool according to an example of the present disclosure.

The driving circuit 35 is connected to the motor 17 and configured to drive the motor 17. The motor 17 includes at least one-phase resistance. In one example, motor 17 includes multi-phase windings. For example, the motor 17 includes a first phase winding A, a second phase winding B and a third phase winding C. The driving circuit 35 is electrically connected to three-phase electrodes U, V and W of the motor 17, and the driving circuit 35 includes multiple driving switches (FIG. 4). Apparently, the windings of the motor 17 may be electrically connected to the power supply device 16 through the multiple driving switches. Multi-phase windings of the motor 17 may be provided.

The first control module 31 is connected to the driving circuit 35, and is configured to output a first control signal to the driving circuit 35. The first control signal is configured to turn on or turn off the motor 17. Turning off the motor 17 includes braking the motor 17 and stopping the motor 17 from running. It should be noted that turning off the motor 17 in the present disclosure includes both braking the motor and stopping the motor from running, which is not described hereinafter.

In one example, the first control module 31 is configured to output the first control signal to the driving switch of the driving circuit 35 so as to control an on-off state of the driving switch of the driving circuit 35, thereby changing a voltage state applied on the winding of the motor 17. The first control module 31 is electrically connected to a first power source circuit 33, and is powered by the first power source circuit 33. The first power source circuit 33 is connected to the power supply device 36, and is powered by the power supply device 36. A voltage output by the power supply device 36 is subject to a voltage change through the first power source circuit 33 so as to output a power supply voltage suitable for the first control module 31. For example, the first power supply circuit 33 is a DC-DC conversion chip. The first control module 31 includes but is not limited to a MCU and a DSP.

The second control module is configured to, in response to receiving a first failure signal from the first control module, output a second control signal to turn off the motor 17. The second control module 32 is electrically connected to a second power source circuit 34, and is powered by the second power source circuit 34. The second power source circuit 34 is electrically connected to the power supply device 36, and is powered by the power supply device 36. A voltage output by the power supply device 36 is subject to a voltage change through the second power source circuit 34 so as to output a power supply voltage suitable for the second control module 32. For example, the second power source circuit 34 is a DC-DC conversion chip. The second control module 32 includes but is not limited to a control circuit (FIG. 10), a MCU (FIG. 11) and a DSP. The first power source circuit 33 and the second power source circuit 34 may be separately disposed, or integrally formed.

The first control module 31 has a first working state and a first failure state. The first control module 31 outputs a first working signal when the first control module 31 is in the first working state, and the first control module 31 outputs a first failure signal when the first control module 31 is the first failure state. The first working signal and the first failure signal output by the first control module 31 are transmitted to the second control module 32. The second control module 32 is connected to the first control module 31 to receive the first working signal or the first failure signal from the first control module 31. The first working signal includes but is not limited to a pulse signal. When the second control module 32 receives the first failure signal from the first control module 31, the second control module 32 outputs the second control signal to turn off the motor 17. The first failure signal may include a zero signal, a weak level signal and the like.

The power tool 10 includes a protection circuit 37. The protection circuit 37 is electrically connected to the second control module 32, and is configured to turn off the motor 17 when the protection circuit 37 receives the second control signal from the second control module 32. In this way, the second control module 32 may further provide a backup protection when the first control module 31 fails, so that the motor 17 may be turned off in time when the first control module 31 fails, thereby avoiding the accidents and having a higher safety.

The protection circuit 37 includes a switch circuit 371. The switch circuit 371 is configured to cut off the electrical connection between the motor 17 and the power supply device 36. The switch circuit 371 may directly cut off the electrical connection between the motor 17 and the power supply device 3, and may also indirectly cut off the electrical connection between the motor 17 and the power supply device 36 through the driving circuit 35. The switch circuit 37 includes at least one electronic switch.

In the protection circuit 37 shown in FIG. 3, the switch circuit 371 is electrically connected between the first control module 31 and the driving circuit 35. The switch circuit 371 includes an electronic switch S3. The electronic switch S3 cuts off the electrical connection between the first control module 31 and the driving circuit 35 so as to indirectly cut off the electrical connection between the motor 17 and the power supply device 36.

In one example, the protection circuit 37 further includes a switch control circuit 372. The switch control circuit 372 is electrically connected to the second control module 32, and is electrically connected to the switch circuit 371. The switch control circuit 372 is configured to control the turn-off of the switch circuit 371 according to the second control signal of the second control module 32, so as to cut off the electrical connection between the motor 17 and the power supply device 36. In this way, the switch circuit 371 indirectly cut off the electrical connection between the motor 17 and the power supply device 36 through controlling the driving circuit 35.

A circuit system of the power tool 10 shown in FIG. 4 is similar to the circuit system shown in FIG. 3, and the circuit system shown in FIG. 4 includes a first control module 41, a second control module 42, a first power source circuit 43, a second power source circuit 44, a driving circuit 45, and a power supply device 46. The above circuit components are the same as or similar to that in FIG. 3, which is not described herein. The circuit system in FIG. 4 is different from the circuit system in FIG. 3 in the protection circuits.

A protection circuit 47 shown in FIG. 4 includes a switch circuit 471. The switch circuit 471 is electrically connected to the power supply device 46, and is connected to a power source terminal of the driving circuit 45. A winding of the motor 17 may be electrically connected to the power supply device 46 through the power source terminal of the driving circuit 45. In this way, the switch circuit 471 may be directly cut off the electrical connection between the power supply device 46 and the motor 17. Different from the switch circuit 371 in FIG. 3 which is connected to a control terminal of the driving circuit 35 and the power supply device 36, the switch circuit 471 in the present example may directly cut off the electrical connection between the motor 17 and the power supply device 46.

Figure 5:
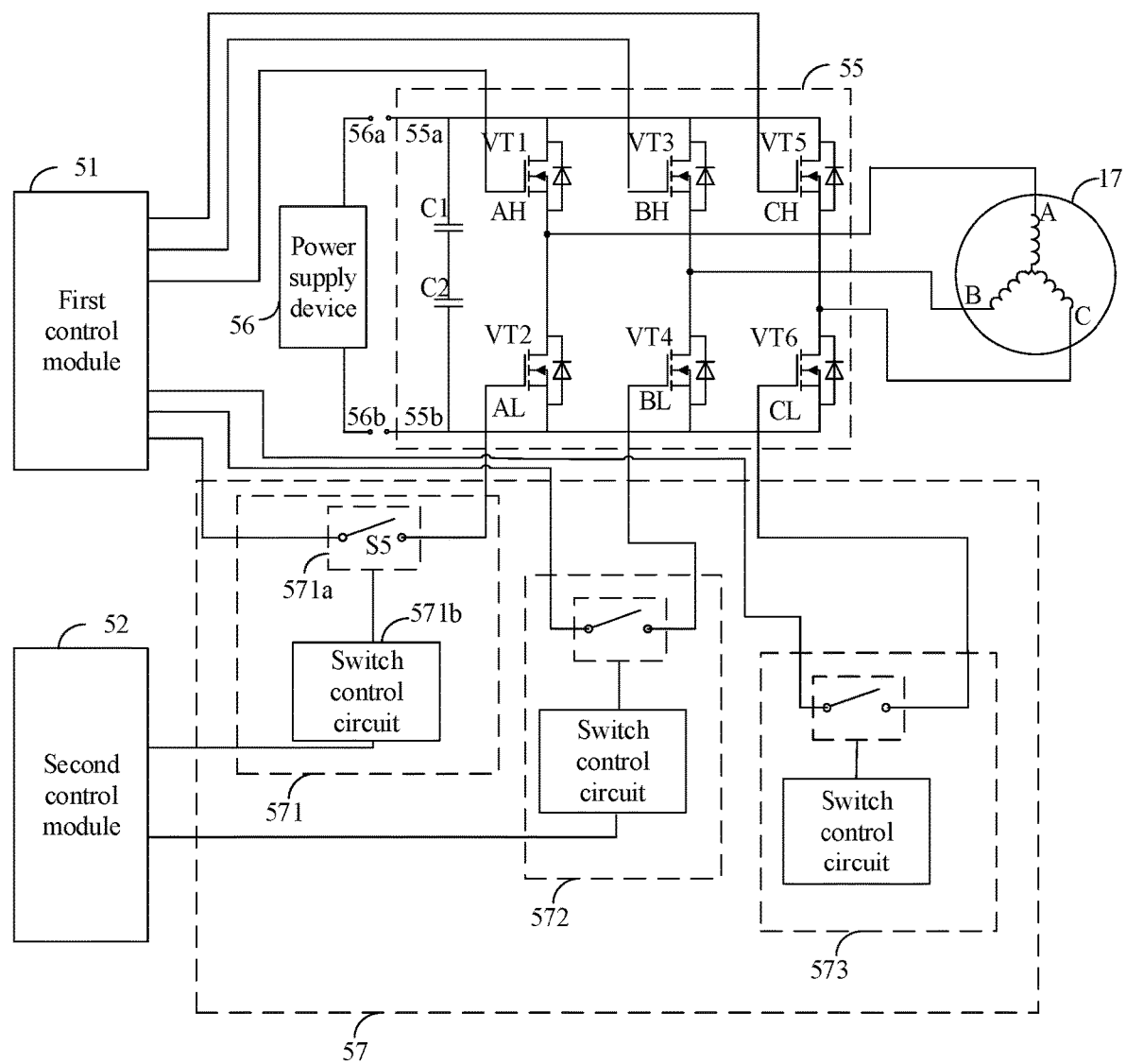
FIG. 5 shows a driving circuit and a protection circuit of the power tool in FIG. 3 according to an example of the present disclosure.

FIG. 5 shows an example circuit of the driving circuit 35 and the protection circuit 37 in FIG. 3. In one example, the driving circuit 55 includes a three-phase bridge circuit formed by six driving switches VT1-VT6. The driving circuit 55 further includes a first driving terminal 55a electrically connected to a first power source terminal 56a of the power supply device 56, and a second driving terminal 55b electrically connected to a second power source terminal 56b of the power supply device 56. The driving switches VT1, VT3 and VT5 in the driving circuit 55 are high-side driving switches, and the driving switches VT2, VT4 and VT6 in the driving circuit 55 are low-side driving switches. The driving switches VT1-VT6 may adopt a field effect tube, an IGBT transistor and the like. The driving circuit 55 is connected to the first control module 51. On-off states of the driving switches VT1-VT6 are changed according to the first control signal output by the first control module 51, so as to change the voltage state of the power supply device 56 applied on the winding of the motor 17, thereby driving the motor 17 to run or turning off the motor 17. It should be noted that the driving circuit 55 may adopts other manners, and other numbers of the driving switches of the driving circuit 55 may be provided, which are not limited to the above examples. The foregoing examples are not intended to limit the present disclosure.

In the present example, control terminals AH, AL, BH, BL, CH and CL of the respective driving switches VT1-VT6 are respectively connected to the first control module 51. High voltage terminals of the high-side driving switches VT1, VT3 and VT5 each are connected to the first power source terminal 56a of the power supply device 56 through the first driving terminal 55a, and low voltage terminals of the high-side driving switches VT1, VT3 and VT5 are connected to a first phase winding A, a second phase winding B and a third phase winding C, respectively. High voltage terminals of the low-side driving switches VT2, VT4 and VT6 are connected to the first phase winding A, the second phase winding B and the third phase winding C, and low voltage terminals of the low-side driving switches VT2, VT4 and VT6 each are connected to the second power source terminal 56b of the power supply device 56 through the second driving terminal 55b. In the present example, the high-side driving switches VT1, VT3 and VT 5 are configured to turn on or cut off the electrical connections between the first phase winding A and the first power source terminal 56a of the power supply device 56, between the second phase winding B and the first power source terminal 56a of the power supply device 56, and between the third phase winding C and the first power source terminal 56a of the power supply device 56, respectively. The low-side driving switches VT2, VT4 and VT6 are configured to turn on or cut off the electrical connections between the first phase winding A and the second power source terminal 56b of the power supply device 56, between the second phase winding B and the second power source terminal 56b of the power supply device 56, and between the third phase winding C and the second power source terminal 56b of the power supply device 56, respectively.

For the three-phase motor 17 and the driving circuit 55 of the three-phase bridge circuit, in the present example, a protection circuit 57 includes three protection circuit branches, namely, a first protection circuit branch 571, a second protection circuit branch 572, and a third protection circuit branch 573. The three protection circuit branches are independent to each other, and have the same or similar functions and compositions. Hereinafter the first protection circuit branch 571 is taken as an example for description, and the other protection circuit branches are the same or similar.

The first protection circuit branch 571 includes a switch circuit 571a and a switch control circuit 571b. The switch circuit 571a is connected between the control terminal of the low-side driving switch VT2 and the first control module 51, and is configured to cut off the electrical connection between the control terminal of the low-side driving switch VT2 and the first control module 51, to cut off the electrical connection between the motor 17 and the power supply device 56 so as to turn off the motor 17. The switch circuit 571a includes at least one electronic switch S5.

The switch control circuit 571b is electrically connected to the second control module 52, and is configured to control the turn-off of the switch circuit 571a according to the second control signal of the second control module 52, so as to cut off the electrical connection between the motor 17 and the power supply device 56.

Figure 6:
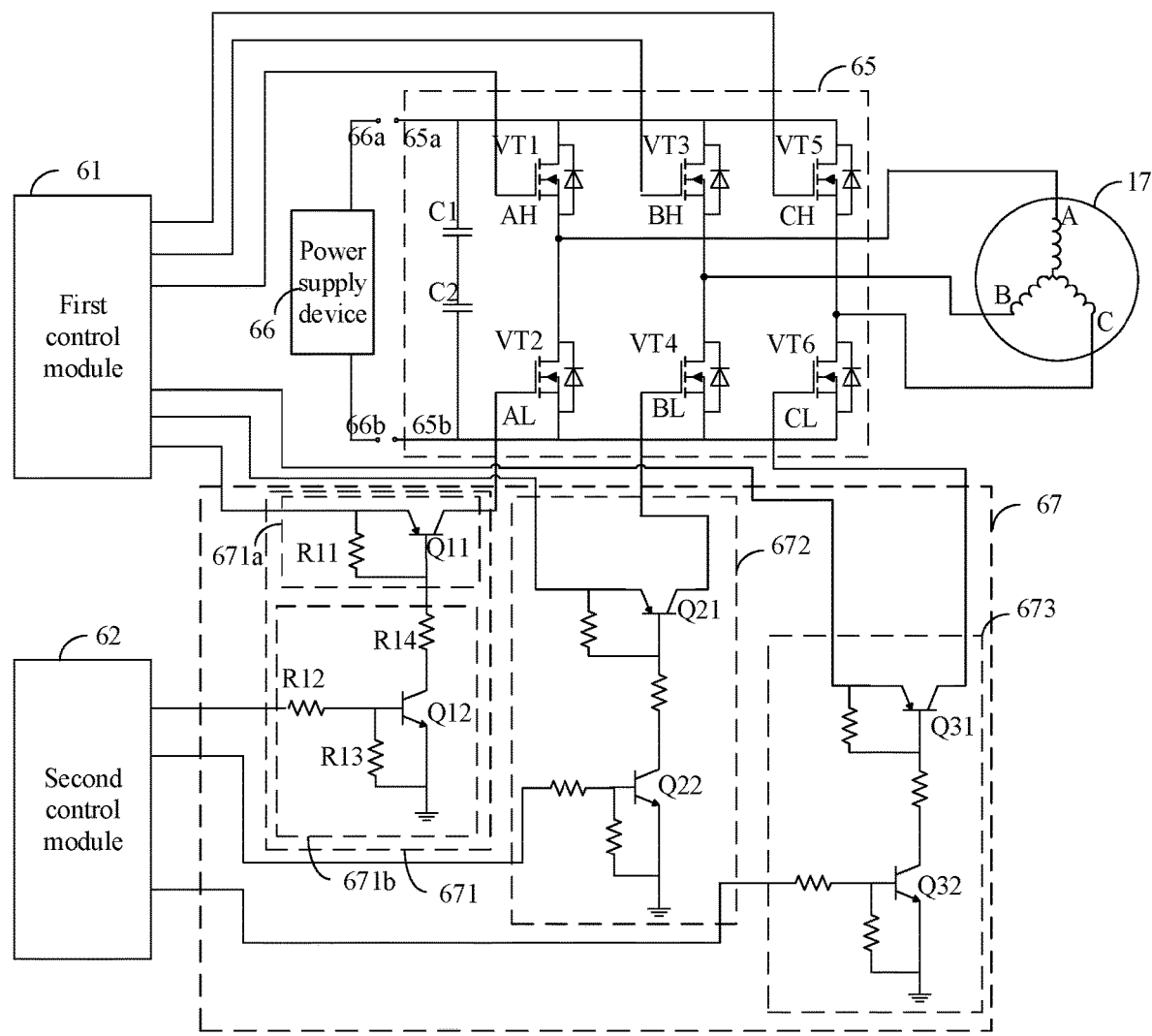
FIG. 6 shows another protection circuit in FIG. 5 according to an example of the present disclosure.

FIG. 6 shows another example circuit of the power tool 10 in FIG. 5. A circuit system in FIG. 6, similar to the circuit system in FIG. 5, includes a first control module 61, a second control module 62, a first power source circuit 63, a second power source circuit 64, a driving circuit 65 and a power supply device 66. The above circuit components are the same as or similar to that in FIG. 5, which is not described herein. The circuit system in FIG. 6 is different from the circuit system in FIG. 5 in the protection circuits thereof.

FIG. 6 exemplarily shows another protection circuit 67 according to the protection circuit 57 in FIG. 5. The protection circuit 67 includes a switch circuit and a switch control circuit. The switch circuit includes first electronic switches Q11, Q21 and Q31. The first electronic switches Q11, Q21 and Q31 are electrically connected between control terminals of at least part of the driving switches of the driving circuit 65 and the first control module 61, and is configured to cut off the electrical connections between the first control module 61 and the at least part of the driving switches of the driving circuit 65. The switch control circuit includes second electronic switches Q12, Q22 and Q32. The second electronic switches Q12, Q22 and Q32 are electrically connected between the first electronic switch Q11 and the second control module 62, between the first electronic switch Q21 and the second control module 62, and between the first electronic switch Q31 and the second control module 62, respectively; and the second electronic switches Q12, Q22 and Q32 are configured to control the turn-off of the first electronic switches Q11, Q21 and Q31 according to the second control signal of the second control module 62, so as to cut off the electrical connection between the first control module 61 and the at least part of the driving switches, thereby cutting off the electrical connection between the motor 17 and the power supply device 66.

Same as the protection circuit in FIG. 5, in one example, the protection circuit in FIG. 6 includes three protection branches, namely, a first protection circuit branch 671, a second protection circuit branch 672, a third protection circuit branch 673. The first protection circuit branch 671, the second protection circuit branch 672, and the third protection circuit branch 673 have the same or similar compositions and functions.

Taken the first protection circuit 671 as an example, the first protection circuit 671 includes a switch circuit 671a and the switch control circuit 671b. The switch circuit 671a includes a first electronic switch Q11 and a resistance R11. The switch control circuit 671b includes a resistance R12, a resistance R13, a resistance R14 and a second electronic switch Q12. In one example, the first electronic switch Q11 is a triode, and the second electronic switch Q12 is a triode.

In one example, a first terminal of the first electronic switch Q11 is connected to a control terminal AL of a driving switch VT2 of the driving circuit 65, a second terminal of the first electronic switch Q11 is electrically connected to the first control module 61, and a control terminal of the first electronic switch Q11 is connected to a first terminal of the second electronic switch Q12 through the resistance R14. The control terminal of the first electronic switch Q11 is further connected to the second terminal of the first electronic switch Q11 through the resistance R11.

The first terminal of the second electronic switch Q12 is connected to the control terminal of the first electronic switch Q11 through the resistance R14, a second terminal of the second electronic switch Q12 is connected to the ground, and a control terminal of the second electronic switch Q12 is connected to the second control module 62 through the resistance R12, and the control terminal of the second electronic switch Q12 is further connected to the ground through the resistance R13.

Since the first protection circuit branch 671, the second protection circuit branch 672, and the third protection circuit branch 673 have the same or similar compositions and functions, the other protection circuit branches are not described herein.

Hereinafter the working principle of the first protection circuit branch 671 is described. During the running process of the power tool 10, the first control module 61 is configured as a main control module and to output a first control signal to the driving switch of the driving circuit 65 to control an on-off state of the driving switch, so as to change a voltage state applied on the winding of motor 17, thereby realizing driving, adjustment, and turning off for the motor 17. The control module 61 has a first working state and a first failure state. When the first control module 61 is in the first working state, the first control module 61 normally works and may normally control the driving circuit 65 to control the motor 17; during this process, the first control module 61 periodically or continuously output a first working signal to the second control module 62 to indicate that the first control module 61 is in the normal state; the second control module 62 receives the first working signal from the first control module 61 and then confirms that the second control module 62 is normal, and the first control module 61 does not perform any action. The first working signal may be, but not limited to, a pulse signal.

When the first control module 61 is in the first failure state, the first control module 61 fails to normally work, and fails to normally control the driving circuit 65, and at this time, the first control module 61 outputs a first failure signal to the second control module 62; the second control module receives the first failure signal from the first control module 61 and then outputs a second control signal to the protection circuit 67 to turn off the motor 17. The first failure signal may be, but not limited to, a weak level signal and zero signal.

When the first control module 61 is in the first working state, the first control module 61 outputs the first working signal to the second control module 62, and the second control module 62 does not output the second control signal but outputs a high level signal to the protection circuit 67. In the present example, the second control module 62 outputs a high level when the second control module 62 is powered on.

Taken the first protection circuit branch 671 as an example, since a high level signal is applied to the control terminal of the second electronic switch Q12, the second electronic switch Q12 is conducting, so that the first electronic switch Q11 is switched on and the first control module 61 is electrically connected to the control terminal of the low-side driving switch VT2. Similarly, the second protection circuit branch 672, the third protection circuit branch 673, and the first protection circuit 671 have the same working principle and working process, the first control module 61 may be electrically connected to the control terminal of the low-side driving switch VT4 and the control terminal of the low-side driving switch VT6, respectively, thereby the first control module 61 may normally control the driving circuit 65.

When the first control module 61 is in the first failure state, the first control module 61 outputs the first failure signal; the second control module 62 receives the first failure signal output by the first control module 61 and then outputs the second control signal, where the second control signal is a low level signal or a weak level signal; at this time, the second electronic switch Q12 is turned off, so that the first electronic switch Q11 is turned off, the low-side driving switch VT 2 of the driving circuit 65 is electrically disconnected to the first control module 61, and the low-side driving switch VT2 is turned off. Similarly, the second protection circuit branch 672, the third protection circuit branch 673, and the first protection circuit branch 671 have the same working principle and working process, the low-side driving switch VT4 and the low-side driving switch VT6 may be turned off, so that a current loop of the winding of the motor 17 may be cut off and the motor 17 stops working, thereby stopping driving the function member 15.

In this way, when the first control module 61 is in the first failure state, the protection circuit 67 receives the second control signal from the second control module 62, the electrical connections between the low-side driving switch VT2 of the driving circuit 65 and the first control module 61, between the low-side driving switch VT4 of the driving circuit 65 and the first control module 61, and between the low-side driving switch VT6 of the driving circuit 65 and the first control module 61 are cut off, so that the power supply device 66 is disconnected to the winding of the motor 17, thereby the motor 17 is turned off, improving the running safety of the power tool 10.

Figure 7:
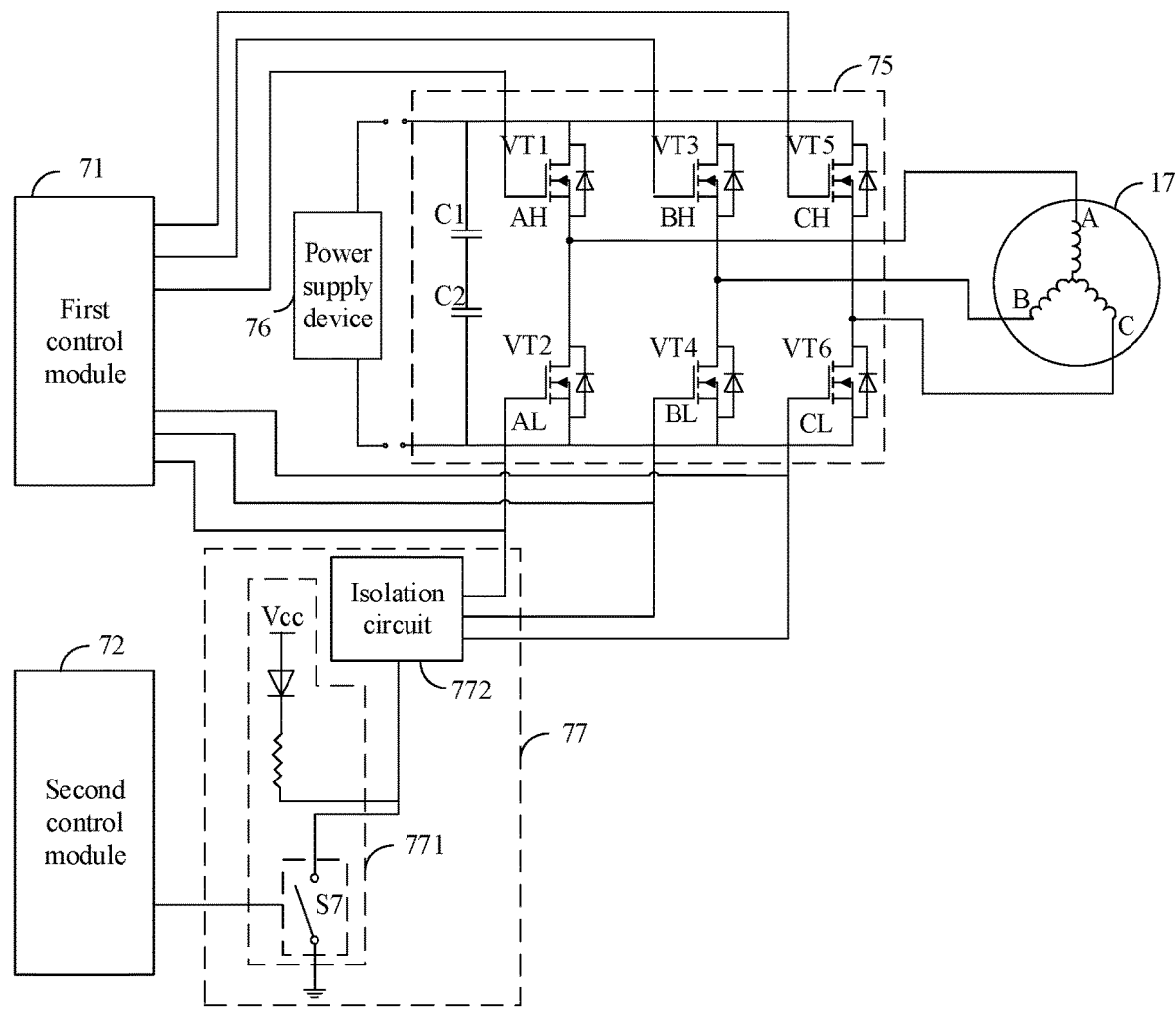
FIG. 7 shows another driving circuit and another protection circuit of the power tool in FIG. 3 according to an example of the present disclosure.

FIG. 7 shows another example circuit of the driving circuit 35 and the protection circuit 37 in FIG. 3. Similar to the circuit systems in FIG. 5 and FIG. 6, a circuit system of a power tool 10 in FIG. 7 includes a first control module 71, a second control module 72, a first power source circuit 73, a second power source circuit 74, a driving circuit 76, and a power supply device 76. The above circuit components are the same as or similar to that in FIG. 6, which is not described herein. The circuit system in FIG. 7 is different from the circuit systems in FIG. 5 and FIG. 6 in the protection circuits thereof.

The protection circuit 77 in FIG. 7 is merely a single circuit rather the three independent protection circuit branches in FIG. 5 and FIG. 6.

In the present example, the protection circuit 77 includes a switch circuit 771, and the switch circuit 771 is configured to cut off the electrical connection between the motor 17 and the power supply device 76.

The switch circuit 771 is connected to the second control module 72, and is configured to, according to the second control signal from the second control module 72, switch on the connection between the at least part of the driving switches and the ground lead so as to cut off the electrical connection between the motor 17 and the power supply device 76. The switch circuit 771 includes a third electronic switch S7.

In the present example, a control terminal of the third electronic switch S7 is electrically connected to the second control module 72, and is configured to, according to the second control signal from the second control module 72, switch on the connection between the at least part of the driving switches and the ground lead so as to cut off the electrical connection between the motor 17 and the power supply device 76.

In one example, the protection circuit 77 further includes an isolation circuit 772, and the isolation circuit 772 is configured to isolate the electrical connection between the protection circuit 77 and the driving circuit 75 when the first control module 71 normally works, to avoid the protection circuit 77 from affecting the driving circuit 75, so that the driving circuit 75 keeps work normally under the control of the first control module 71. The isolation circuit 772 is connected to the control terminals of the respective low-side driving switches VT2, VT4 and VT6, and is electrically connected to the switch circuit 771.

One end of the third electronic switch S7 is connected to the control terminals of the respective low-side driving switches VT2, VT4 and VT6 of the driving circuit 75 through the isolation circuit 772, and other end of the third electronic switch S7 is connected to the ground through the ground lead. The switch circuit 771 further includes a pull-up power source Vcc, and the pull-up power source Vcc is configured to supply power to the switch circuit 771.

Figure 8:
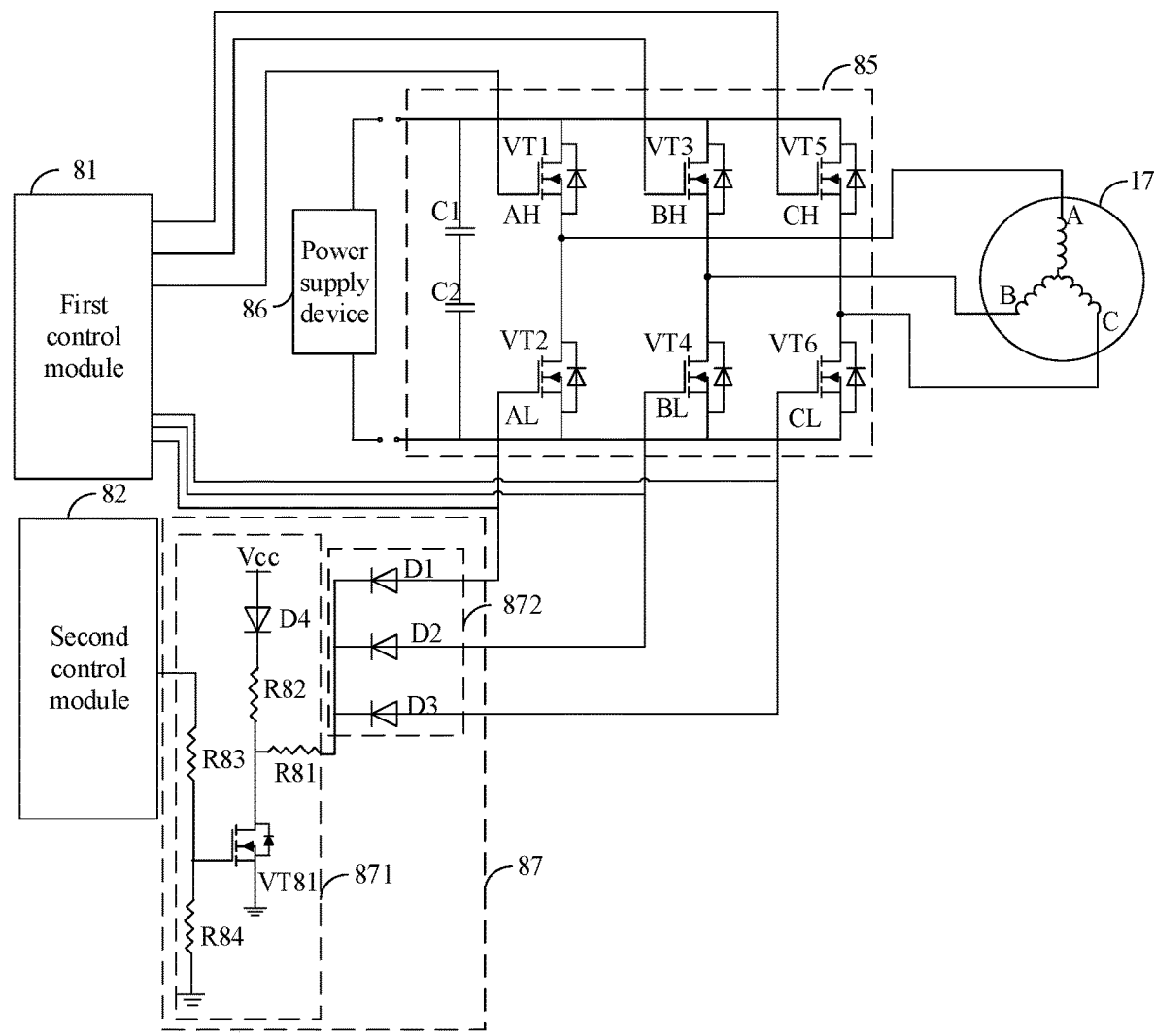
FIG. 8 shows another protection circuit of the power tool in FIG. 4 according to an example of the present disclosure.

FIG. 8 exemplarily shows another circuit of the power tool 10 in FIG. 7. A circuit system in FIG. 8, similar to that in FIG. 7, includes a first control module 81, a second control module 82, a first power source circuit 83, a second power source circuit 84, a driving circuit 85 and a power supply device 86. The above circuit components are the same as or similar to that in FIG. 7, which is not described herein. The circuit system in FIG. 8 is different from the circuit system in FIG. 7 in the protection circuits thereof.

In one example, a protection circuit 87 in FIG. 8 includes a switch circuit 871 and an isolation circuit 872. The switch circuit 871 includes an electronic switch VT81, a resistance 81, a resistance 82, a resistance 83, a resistance 84, a pull-up power source Vcc and a unilateral diode D4. The electronic switch VT81 serves as another example of the third electronic switch S7 in FIG. 7.

In the switch circuit 871, the electronic switch VT81 may be, but not limited to, a MOSFET. A control terminal of the electronic switch VT81 is connected to the second control module 82 through the resistance R83, and is connected to the ground through the resistance R84. One end of the electronic switch VT81 is connected to the ground lead (or the ground), and another end of the electronic switch VT81 is connected to the pull-up power source Vcc through the pull-up resistance R82 and is connected to the isolation circuit 872 through the resistance R81.

The isolation circuit 872 includes three unilateral diodes D1, D2 and D3. Cathodes of the unilateral diodes D1, D2 and D3 of the isolation circuit 872 each are connected to the another end of the electronic switch VT81 through the resistance R81, and anodes of the unilateral diodes D1, D2 and D3 are connected to the control terminals of the low-side driving switches VT2, VT4 and VT6, respectively. The unilateral diodes D1, D2 and D3 are configured to isolate the electrical connection between the protection circuit 87 and the driving circuit 85 when the first control module 81 normally works, to avoid the protection circuit 87 from affecting the driving circuit 85, so that the driving circuit 85 keeps work normally under the control of the first control module 81.

Hereinafter the working principle of the protection circuit 87 in the present example is described. When the first control module 81 is in the first working state, the first control module 81 outputs the first working signal to the second control module 82, the second control module 82 outputs a low level signal or does not output a signal, the electronic switch VT81 is not conducting, the unilateral diodes D1, D2 and D3 in the isolation circuit 872 are cut off, and the low-side driving switches VT2, VT4 and VT6 are still normally controlled by the first control module 81. In the present example, the second control module 82 is configured to output the low level signal or not output the signal when the second control module 82 is powered on.

When the first control module 81 is in the first failure state, the first control module 81 outputs the first failure signal to the second control module 82, the second control module 82 receives the first failure signal from the second control module 82 and then outputs the second control signal to the protection circuit 87, where the second control signal is a high level signal; the electronic switch VT81 is conducting, the negative electrodes of the unilateral diodes D1, D2 and D3 are pulled down to the ground; the unilateral diodes D1, D2 and D3 are conducting, the signals of the control terminals of the low-side driving switches VT1, VT4 and VT6 are pulled low, and the low-side driving switches VT2, VT4 and VT6 are switched off, so as to cut off the electrical connection between the power supply device 86 and the motor 17.

Figure 9:
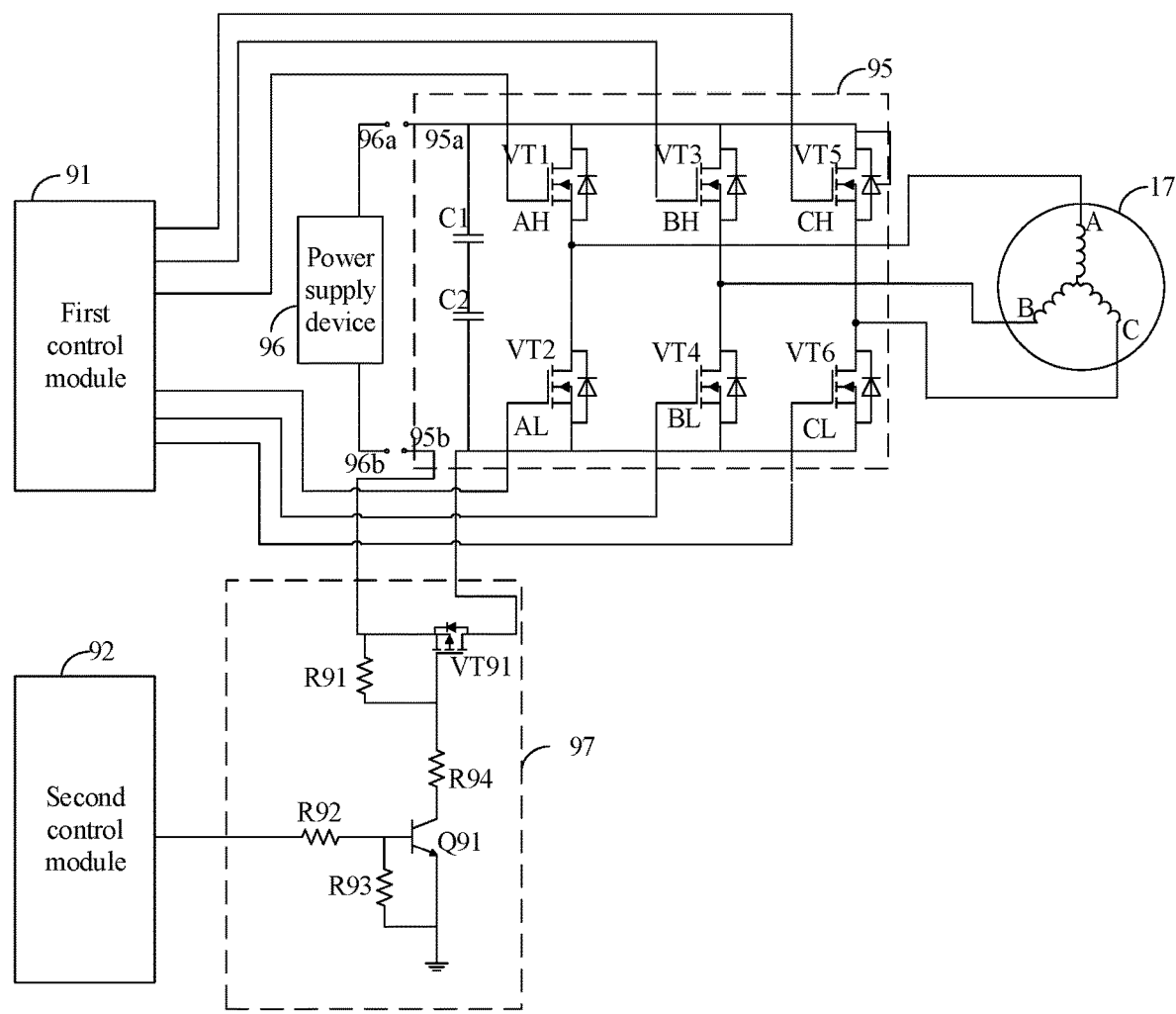
FIG. 9 shows another driving circuit and another protection circuit of the power tool in FIG. 4 according to an example of the present disclosure.

FIG. 9 shows another driving circuit and another protection circuit in the circuit system of the power tool 10 in FIG. 4.

The power tool 10 in FIG. 9, similar to that in FIG. 4, includes a first control module 91, a second control module 92, a first power source circuit 93, a second power source circuit 94, a driving circuit 95 and a power supply device 96. The above circuit components have compositions and functions that are the same as or similar to that in FIG. 6, and the driving circuit 95 has compositions and functions that are the same as or similar to that in FIG. 5, which are not described herein. The driving circuit 95 includes a first driving terminal 95a electrically connected to a first power source terminal 96a of the power supply device 96, and a second driving terminal 95b electrically connected to a second power source terminal 96b of the power supply device 96.

The protection circuit 97 in FIG. 9 includes a switch circuit 971, the switch circuit 971 is electrically connected between the power supply device 96 and the second terminal 95b of the driving terminal 95, and the winding of the motor 17 may be electrically connected to the power supply device 96 through the second terminal 95b of the driving circuit 95. In this way, the switch circuit 971 may directly cut off the electrical connection between the power supply device 97 and the motor 17.

In one example, the protection circuit 97 includes a first electronic switch VT91, a resistance R91, a resistance R92, a resistance R93, a resistance R94, and a second electronic switch Q91. In one example, the first electronic switch VT91 is a MOSFET, and the second electronic switch Q91 is a triode.

An input terminal of the first electronic switch VT91, an output terminal of the first electronic switch VT91 and the second terminal 95b of the driving circuit 95 are connected in series. A control terminal of the first electronic switch VT91 is connected to a first terminal of the second electronic switch Q91 through the resistance R94, and is further connected to the input terminal of first electronic switch VT91 through the pull-up resistance R91.

The first terminal of the second electronic switch Q91 is connected to the control terminal of the first electronic switch TV91, a second terminal of the second electronic switch Q91 is connected to the ground, and a control terminal of the second electronic switch Q91 is connected to the power source Vcc through the voltage dividing resistance R92 and is connected to the ground through the voltage dividing resistance R93. The protection circuit 97 further includes a pull-up power source Vcc, and the pull-up power source Vcc is configured to supply power to the protection circuit 97.

Figure 10:
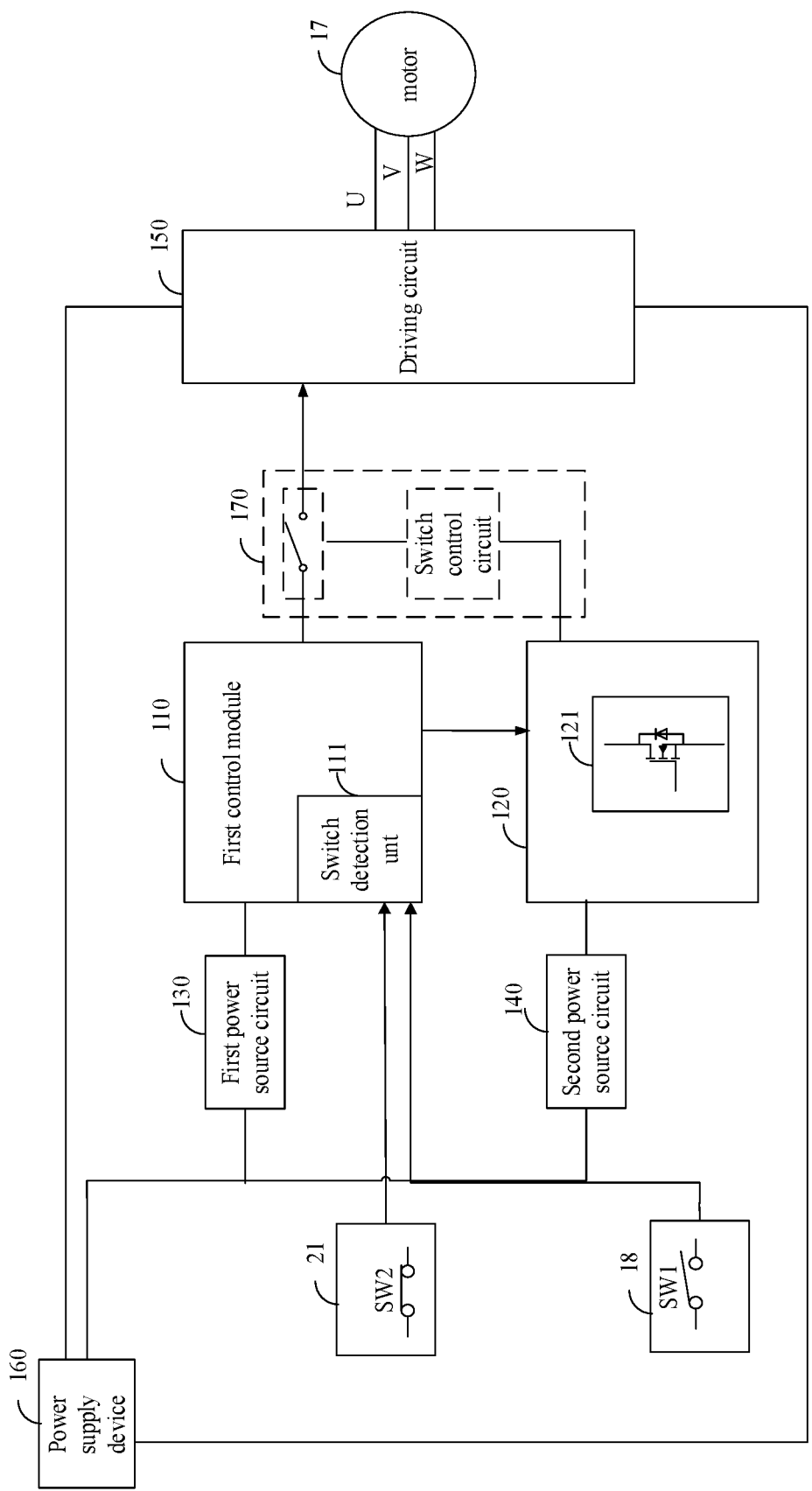
FIG. 10 is a circuit block diagram illustrating another power tool in FIG. 3 where the second control module includes a control circuit according to an example of the present disclosure.

A circuit system of the power tool 10 in FIG. 10 is the same as or similar to that in FIG. 3, and the difference between the circuit systems in FIG. 10 and FIG. 3 lies in that the second control module 120 in FIG. 10 adopts a control circuit 121 and the control circuit 121 includes at least one electronic switch.

In one example, the circuit system of the power tool 10 includes a first control module 110, a second control module 120, a first power source circuit 130, a second power source circuit 140, a driving circuit 150, a power supply device 160, a protection circuit 170 and a motor 17. The above circuit components in this example have compositions and functions that are the same as or similar to that in FIG. 3, which is not described herein.

Figure 11:
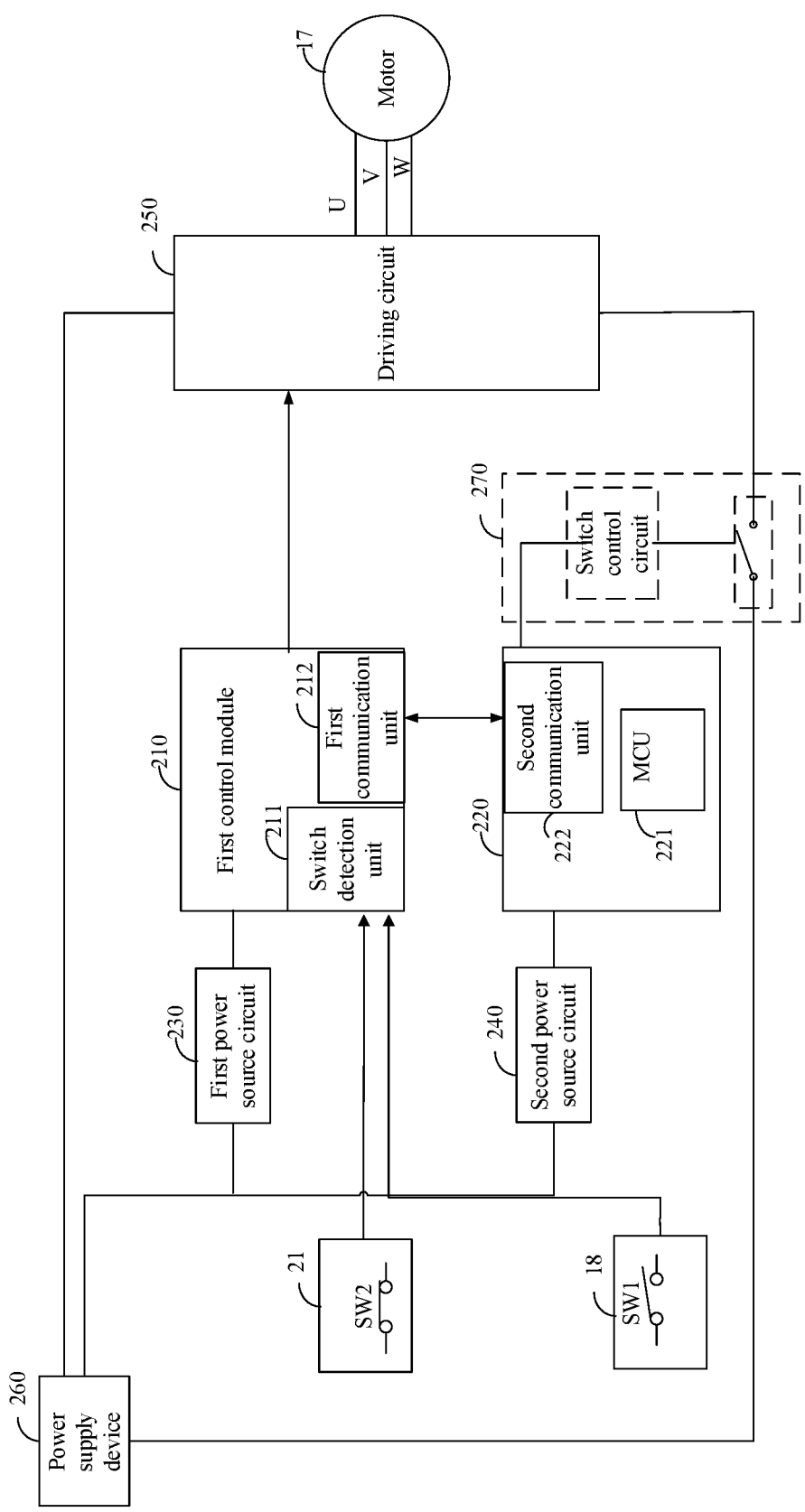
FIG. 11 is a circuit block diagram illustrating another power tool in FIG. 4 where the second control module includes a MCU according to an example of the present disclosure.

A circuit system of the power tool 10 in FIG. 11 is the same as or similar to that in FIG. 4, and the difference between the circuit systems in FIG. 11 and FIG. 4 lies in that the first control module 210 and the second control module 220 in FIG. 11 are in communication connection with each other, so that the first control module 210 and the second control module 220 send signals to each other and receive signals from each other.

The circuit system of the power tool 10 in FIG. 11 includes a first control module 210, a second control module 220, a first power source circuit 230, a second power source circuit 240, a driving circuit 250, a power supply device 260, a protection circuit 270 and a motor 17. The above circuit components in this example have compositions and functions that are the same as or similar to that in FIG. 4, which is not described herein. Apparently, the second control module 120 in the circuit system in FIG. 10 may adopt the second control module 220 in FIG. 11, and the second control module 220 in FIG. 11 may adopt the second control module 120 in FIG. 10.

In the present example, the first control module 210 is configured to output a first control signal to the driving circuit 150, so as to perform speed adjustment, driving and turn-off and the like on the motor 17. The first control module 210 has a first working state and a first failure state. When the first control module 210 is in the first working state, the first control module 210 outputs the first working signal to the second control module 220. When the first control module 210 is in the first failure state, the first control module 210 outputs the first failure signal to the second control module 220.

In the present example, the second control module 220 also has a second working state and a second failure state. When the second control module 220 is in the second working state, the second control module 220 outputs a second working signal to the first control module 210. When the second control module 220 is in the second failure state, the second control module 220 outputs a second failure signal to the first control module 210.

In the present example, the first control module 210 includes a first communication unit 212, and the second control module 220 further includes a second communication unit 222. The first communication unit 212 and the second communication unit 222 are in communication connection with each other, for example, in wireless communication connection or in wire communication connection. The first control module 210 and the second control module 220 send signals to each other and receive signals from each other through the first communication unit 212 and the second communication unit 222. In the present example, the first control module 210 includes a control chip, for example, a MCU; and the second control module 220 includes a MCU 221. The second control module 220 is connected to the protection circuit 270, and the protection circuit 270 may adopt the protection circuit 47 in FIG. 4 or the protection circuit 37 in FIG. 3, which are not described herein.

When the first control module 210 receives the second failure signal from the second control module 220, the first control module 210 outputs the first control signal to turn off the motor 17. In one example, when the first control module 210 receives the second failure signal from the second control module 220, the first control module 210 outputs the first control signal to the driving circuit 250, to stop the driving circuit 250 from working or cause the driving circuit 250 to brake the motor 17, so as to turn off the motor 17. In this way, the motor 17 is stopped from driving the function member 15 of the power tool 10. The second failure signal may include a zero signal, a weak level signal and the like.

Similarly, when the second control module 220 receives the first failure signal from the first control module 210, the second control module 220 outputs the second control signal to the protection circuit 270 to turn off the motor 17. In one example, when the second control module 220 receives the first failure signal from the first control module 210, the second control module 220 outputs the second control signal to the protection circuit 270, and the protection circuit 270 receives the second control signal from the second control module 220 and then turns off the motor 17. In this way, the motor 17 is stopped from driving the function member. The first failure signal may include a zero signal, a weak level signal and the like.

In the present example, during the working process of the motor 17, once the first control module 210 receives the second failure signal from the second control module 220, the first control module 210 immediately outputs the first control signal to turn off the motor 17. Similarly, once the second control module 220 receives the first failure signal from the first control module 210, the second control module 220 immediately outputs the second control signal to turn off the motor 17. In this way, the accidents and the damage of the power tool 10 are avoided.

That is to say, during the working process of the power tool 10, the first control module 210 and the second control module 220 are in the normal working state, the first control module 210 and the second control module 220 send the working signal to each other, to inform the received one that the sent one is in the normal working state; after the received one receives the working signal, the received one maintains the state. The first working signal and the second working signal may be the pulse signal. When the first control module 210 and the second control module 220 are in the unnormal failure state, the first control module 210 and the second control module 220 send the failure signal to each other, the received one receives the failure signal and then outputs the control signal to turn off the motor 17. In this way, when one of the control modules fails, the other one may provide backup protection to turn off the motor 17 in time, so that the power tool 10 has a higher safety.

In the circuit systems of the power tools 10 in FIG. 3, FIG. 4, FIG. 10 and FIG. 11, the power tools 10 each further include a start switch 18, and the start switch is configured to at least start the motor 17 and is connected to the first control module (31, 41, 110 and 210). The start switch 18 is associatively connected to the trigger mechanism 14. When the trigger mechanism 14 is triggered, the start switch 18 associatively connected to the trigger mechanism 14 is accordingly triggered and the on-off state of the start switch 18 is changed.

The first control module (31, 41, 110 and 210) further includes a switch detection unit (311, 411, 111 and 211). The start switch 18 is connected to the switch detection unit (311, 411, 111 and 211), and the switch detection unit (311, 411, 111 and 211) may detect the trigger state of the start switch 18 so as to perform corresponding control according to the trigger state of the start switch 18. In one example, after the switch detection unit 311 detects that the start switch 18 is triggered, the first control module (31, 41, 110 and 210) outputs the first control signal to the driving circuit (35, 45, 150 and 250) to control the driving circuit (35, 45, 150 and 250) to start the motor 17.

In one example, the start switch 18 may be configured to stop the motor 17 from working. In one example, the start switch 18 has two states, namely an on-state and an off-state. When the start switch 18 is in the on-state, the start switch 18 is configured to start the motor 17; when the start switch 18 is in the off-state, the start switch 18 is configured to stop the motor 17 from working. The switch detection unit (311, 411, 111 and 211) may detect the different states of the start switch 18, so as to output the first control signal to the driving circuit (35, 45, 150 and 250) according to the different states of the start switch 18, thereby corresponding controlling the motor (34, 45, 150 and 250). In one example, the start switch 18 is a signal switch.

In one example, the power tool 10 further includes a brake switch 21. The brake switch 21 is connected to the first control module (31, 41, 110 and 210) and is configured to brake the motor 17. In one example, the brake switch 21 is connected to the switch detection unit (311, 411, 111 and 211) of the first control module (31, 41, 110 and 210), and the switch detection unit 311 may detect the trigger state of the brake switch 21 so as to perform corresponding control according to the trigger state of the brake switch 21. In one example, when the switch detection unit 311 detects that the brake switch 21 is triggered, the switch detection unit 311 outputs the first control signal to the driving circuit 35 to control the driving circuit 35 so as to brake the motor 17. In one example, the brake switch 21 is a signal switch.

As shown in FIG. 11, the first control module 210 is further configured to, in condition that the first control module 210 detects that the start switch 18 is triggered and receives the second working signal from the second control module 220, output the first control signal to the driving circuit 250 to start the motor 17.

In one example, the start switch 18 has two states, namely the on-state and the off-state. When the switch detection unit (311, 411, 111 and 211) detects that the start switch 18 is in the on-state, the first control module (31, 41, 110 and 210) outputs the first control signal to the driving circuit (35, 45, 150 and 250) to start the motor (35, 45, 150 and 250). When the switch detection unit (311, 411, 111 and 211) detects that the start switch 18 is in the off-state, the first control module (31, 41, 110 and 210) outputs the first control signal to the driving circuit (35, 45, 150 and 250) to stop the motor 17 from working. In one example, only when the switch detection unit (311, 411, 111 and 211) detects that the start switch 18 is in the on-state and the brake switch 21 is not triggered, the first control module (31, 41, 110 and 210) outputs the first control signal to the driving circuit (35, 45, 150 and 250) to start the motor (35, 45, 150 and 250).

The first control module 210 is further configured to, in condition that the first control module 210 detects that the brake switch 21 is triggered and receives the second working signal from the second control module 220, output the first control signal to the driving circuit 65 to brake the motor 17.

In this way, only when the second control module 220 is in the second working state (the normal working state), i.e. only when the first control module 210 receives the second working signal from the second control module 220, the first control module 210 normally works, i.e. the power tool and the motor 17 are normally controlled according to the state of the start switch 18 or the state of the brake switch 21. Once the first control module 210 receives the second failure signal from the second control module 220, the first control module 210 outputs the first control signal to the driving circuit 250 to turn off the motor 17 regardless of the state of start switch 18 or the brake switch 21, or whether the start switch 18 or the brake switch 21 is triggered or not. Therefore, after the second control module 220 fails, the first control module may immediately turn off the motor 17.

Apparently, as mentioned above, when the first control module 210 fails, the second control module 220 may immediately output the second control signal to the protection circuit 270 to turn off the motor 17.

Based on the above, in the present disclosure, two control modules are provided, when one of the two control modules fails, another of the two control modules may provide backup protection, so that the power tool has a higher running safety.

The basic principles, main features and advantages of the present disclosure have been shown and described above. It is to be understood by any person skilled in the art that the foregoing examples are not intended to limit the present disclosure in any form. All technical solutions obtained by equivalent substitution or equivalent transformation are within the scope of the present disclosure.

What is claimed is:

1. A power tool, comprising:
    a function member, configured to realize a function of the power tool;
    a motor, configured to drive the function member;
    a driving circuit, electrically connected to the motor and configured to drive the motor;
    a first control module, configured to output a first control signal to the driving circuit, wherein the first control module has a first working state and a first failure state, the first control module is configured to, in condition that the first control module is in the first working state, output a first working signal, and the first control module is further configured to, in condition that the first control module is in the first failure state, output a first failure signal; and a second control module, electrically connected to the first control module, wherein the second control module is configured to receive the first working signal or the first failure signal from the first control module, wherein the second control module is configured to, in response to receiving the first failure signal from the first control module, output a second control signal to turn off the motor, wherein the first control module and the second control module are in communication connection to each other, the second control module has a second working state and a second failure state, the second control module is configured to, in condition that the second control module is in the second working state, output a second working signal to the first control module, the second control module is further configure to, in condition that the second control module is in the second failure state, output a second failure signal to the first control module, and the first control module is configured to, in response to receiving the second failure signal from the second control module, output a first control signal to turn off the motor, and wherein the first failure state is associated with the condition of at least one of a first switch or a first sensor and the second failure state is associated with the condition of at least one of a second switch or a second sensor.

2. The power tool according to claim 1, further comprising a protection circuit, wherein the protection circuit is electrically connected to the second control module and is configured to, in response to receiving the second control signal from the second control module, turn off the motor.

3. The power tool according to claim 2, further comprising a power supply device configured to supply power to the power tool, wherein the protection circuit comprises a switch circuit, the switch circuit is configured to cut off an electrical connection between the motor and the power supply device, and the switch circuit comprises at least one electronic switch.

4. The power tool according to claim 3, wherein the protection circuit further comprises a switch control circuit, the switch control circuit is electrically connected to the switch circuit and the second control module, and the switch control circuit is configured to control on-off operations of the switch circuit according to the second control signal from the second control module so as to cut off the electrical connection between the motor and the power supply device.

5. The power tool according to claim 4, wherein the driving circuit comprises a plurality of driving switches, the switch circuit comprises a first electronic switch, the first electronic switch is electrically connected between control terminals of at least part of the plurality of driving switches and the first control module, the first electronic switch is configured to cut off electrical connections between the first control module and the control terminals of the at least part of the plurality of driving switches, the switch control circuit comprises a second electronic switch, the second electronic switch is electrically connected between a control terminal of the first electronic switch and the second control module, and the second electronic switch is configured to control the on-off operations of the first electronic switch according to the second control signal of the second control module so as to cut off the electrical connections between the first control module and the at least part of the plurality of driving switches, thereby cutting off the electrical connection between the motor and the power supply device.

6. The power tool according to claim 3, wherein the driving circuit comprises a plurality of driving switches, the switch circuit comprises a third electronic switch, the third electronic switch is electrically connected between control terminals of at least part of the plurality of driving switches and a ground lead, a control terminal of the third electronic switch is electrically connected to the second control module, and the third electronic switch is configured to switch on connections between the at least part of the plurality of driving switches and the ground lead according to the second control signal of the second control module so as to cut off the electrical connection between the motor and the power supply device.

7. The power tool according to claim 1, wherein the second control module comprises a control circuit and the control circuit comprises at least one switch element or the second control module comprises a microcontroller.

8. The power tool according to claim 1, further comprising a start switch configured to at least start the power tool, wherein the start switch is connected to the first control module, and the first control module is configured to, in condition that the first control module detects that the start switch is triggered and receives the second working signal from the second control module, output the first control signal to start the motor.

9. The power tool according to claim 1, further comprising a brake switch configured to brake the motor, wherein the brake switch is connected to the first control module, and the first control module is configured to, in condition that the first control module detects that the brake switch is triggered and receives the second working signal from the second control module, output the first control signal to the driving circuit so as to brake the motor.

10. A chain saw, comprising:
a saw chain, configured to realize a cutting function;
a motor, configured to drive the saw chain;
a driving circuit, electrically connected to the motor and configured to drive the motor;
a first control module, configured to output a first control signal to the driving circuit, wherein the first control module has a first working state and a first failure state, the first control module is configured to, in condition that the first control module is in the first working state, output a first working signal, and the first control module is further configured to, in condition that the first control module is in the first failure state, output a first failure signal; and
a second control module, electrically connected to the first control module, wherein the second control module is configured to receive the first working signal or the first failure signal from the first control module,
wherein the second control module is configured to, in response to receiving the first failure signal from the first control module, output a second control signal to turn off the motor,
wherein the first control module and the second control module are in communication connection to each other, the second control module has a second working state and a second failure state, the second control module is configured to, in condition that the second control module is in the second working state, output a second working signal to the first control module, the second control module is further configure to, in condition that the second control module is in the second failure state, output a second failure signal to the first control module, and the first control module is configured to, in response to receiving the second failure signal from the second control module, output a first control signal to turn off the motor, and wherein the first failure state is associated with the condition of at least one of a first switch or a first sensor and the second failure state is associated with the condition of at least one of a second switch or a second sensor.

11. The chain saw according to claim 10, further comprising a protection circuit, wherein the protection circuit is electrically connected to the second control module and is configured to, in response to receiving the second control signal from the second control module, turn off the motor.

12. The chain saw according to claim 11, further comprising a power supply device configured to supply power to the chain saw, wherein the protection circuit comprises a switch circuit, the switch circuit is configured to cut off an electrical connection between the motor and the power supply device, and the switch circuit comprises at least one electronic switch.

13. The chain saw according to claim 12, wherein the protection circuit further comprises a switch control circuit, the switch control circuit is electrically connected to the switch circuit and the second control module, and the switch control circuit is configured to control on-off operations of the switch circuit according to the second control signal from the second control module so as to cut off the electrical connection between the motor and the power supply device.

14. The chain saw according to claim 13, wherein the driving circuit comprises a plurality of driving switches, the switch circuit comprises a first electronic switch, the first electronic switch is electrically connected between control terminals of at least part of the plurality of driving switches and the first control module, the first electronic switch is configured to cut off electrical connections between the first control module and the control terminals of the at least part of the plurality of driving switches, the switch control circuit comprises a second electronic switch, the second electronic switch is electrically connected between a control terminal of the first electronic switch and the second control module, and the second electronic switch is configured to control the on-off operations of the first electronic switch according to the second control signal of the second control module so as to cut off the electrical connections between the first control module and the at least part of the plurality of driving switches, thereby cutting off the electrical connection between the motor and the power supply device.

15. The chain saw according to claim 12, wherein the driving circuit comprises a plurality of driving switches, the switch circuit comprises a third electronic switch, the third electronic switch is electrically connected between control terminals of at least part of the plurality of driving switches and a ground lead, a control terminal of the third electronic switch is electrically connected to the second control module, and the third electronic switch is configured to switch on connections between the at least part of the plurality of driving switches and the ground lead according to the second control signal of the second control module so as to cut off the electrical connection between the motor and the power supply device.

16. The chain saw according to claim 10, wherein the second control module comprises a control circuit and the control circuit comprises at least one switch element or the second control module comprises a microcontroller.

17. The chain saw according to claim 10, further comprising a start switch configured to at least start the chain saw, wherein the start switch is connected to the first control module, and the first control module is configured to, in condition that the first control module detects that the start switch is triggered and receives the second working signal from the second control module, output the first control signal to start the motor.

18. The chain saw according to claim 10, further comprising a brake switch configured to brake the motor, wherein the brake switch is connected to the first control module, and the first control module is configured to, in condition that the first control module detects that the brake switch is triggered and receives the second working signal from the second control module, output the first control signal to the driving circuit so as to brake the motor.

* * * * *